United States Patent [19]
Domesle et al.

[11] Patent Number: 5,628,925
[45] Date of Patent: May 13, 1997

[54] PROCESS FOR MANUFACTURING A COATED, MONOLITHIC METAL SUPPORT

[75] Inventors: Rainer Domesle, Alzenau, Germany; Bernd Engler, White Plains, N.Y.; Egbert Lox, Hanau, Germany

[73] Assignee: Degussa Aktiengesellschaft, Frankfurt, Germany

[21] Appl. No.: 413,943

[22] Filed: Mar. 30, 1995

[30] Foreign Application Priority Data

Mar. 31, 1994 [DE] Germany .................. 44 11 302.1

[51] Int. Cl.⁶ .................................................. B23K 26/00
[52] U.S. Cl. .................. 219/121.64; 60/299; 219/118; 219/121.14; 422/180
[58] Field of Search .................. 219/121.64, 121.63, 219/121.14, 121.13, 118; 228/181; 29/890; 422/180; 60/299, 322, 323

[56] References Cited

U.S. PATENT DOCUMENTS

| | | | |
|---|---|---|---|
| 4,186,172 | 1/1980 | Scholz | 422/180 |
| 4,316,823 | 2/1982 | Bozon et al. | 422/180 |
| 4,381,590 | 5/1983 | Nonnenmann et al. | 29/890 |
| 4,824,011 | 4/1989 | Maus et al. | 228/181 |
| 4,923,109 | 5/1990 | Cyron | 228/181 |
| 4,942,285 | 7/1990 | Ishikawa et al. | 219/121.64 |
| 5,102,743 | 4/1992 | Maus et al. | 428/593 |
| 5,306,890 | 4/1994 | Minamida et al. | 219/121.64 |
| 5,336,472 | 8/1994 | Toyoda et al. | 422/180 |
| 5,366,700 | 11/1994 | Humpolik et al. | 422/180 |

FOREIGN PATENT DOCUMENTS

| | | |
|---|---|---|
| 0591689 | 4/1994 | European Pat. Off. |
| 2924592 | 1/1981 | Germany |
| 2946685 | 6/1985 | Germany |
| 4214340 | 11/1992 | Germany |
| 89/07488 | 8/1989 | WIPO |
| 92/14549 | 9/1992 | WIPO |

*Primary Examiner*—Geoffrey S. Evans
*Attorney, Agent, or Firm*—Beveridge, DeGrandi, Weilacher & Young L.L.P.

[57] ABSTRACT

A method is disclosed for manufacturing a monolithic metal support with a coated, gas-permeable shaped body. The shaped body is formed of one or more smooth and/or corrugated metal foil strips previously coated with a dispersion coating. During or after formation of the shaped body, the metal foil strips are joined by soldering or welding to at least one adjacent metal foil strip or to at least one adjacent layer of the same metal foil strip.

12 Claims, 5 Drawing Sheets

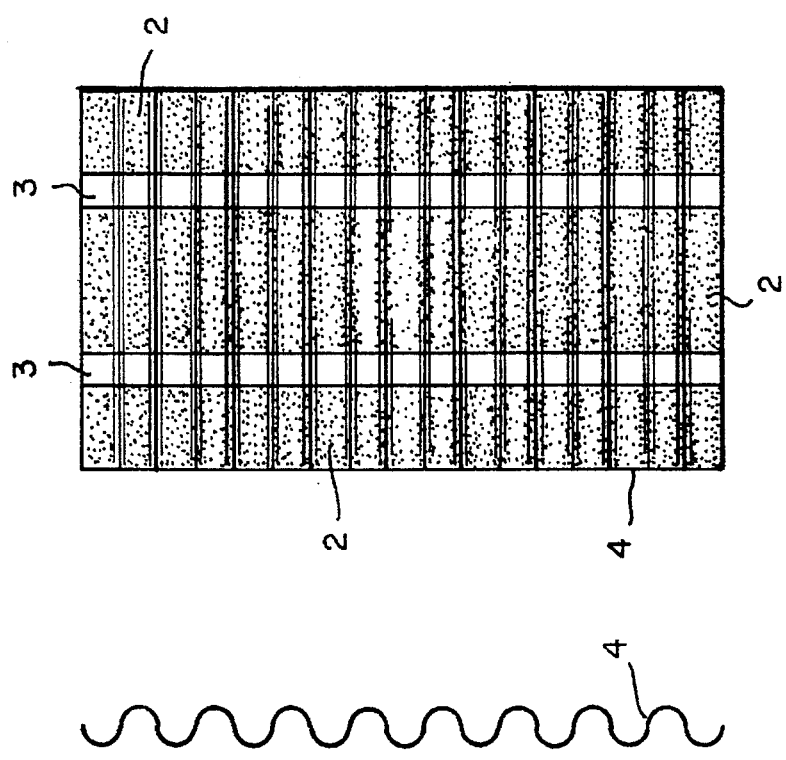
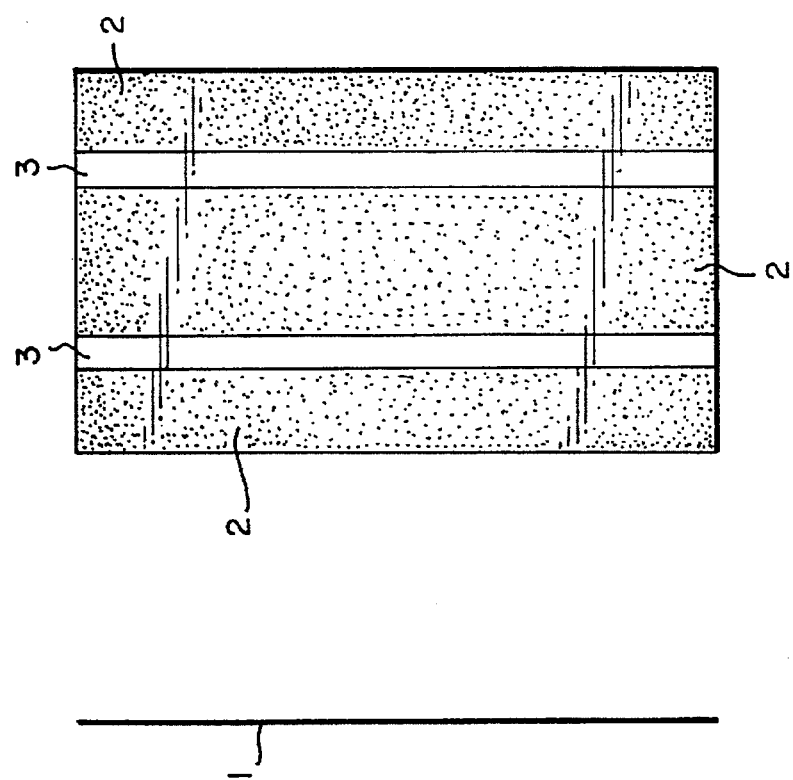
FIG.1
FIG.1-A
FIG.2
FIG.2-A

FIG.3
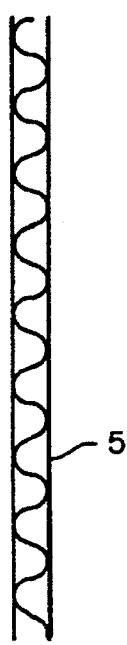
FIG.3-A
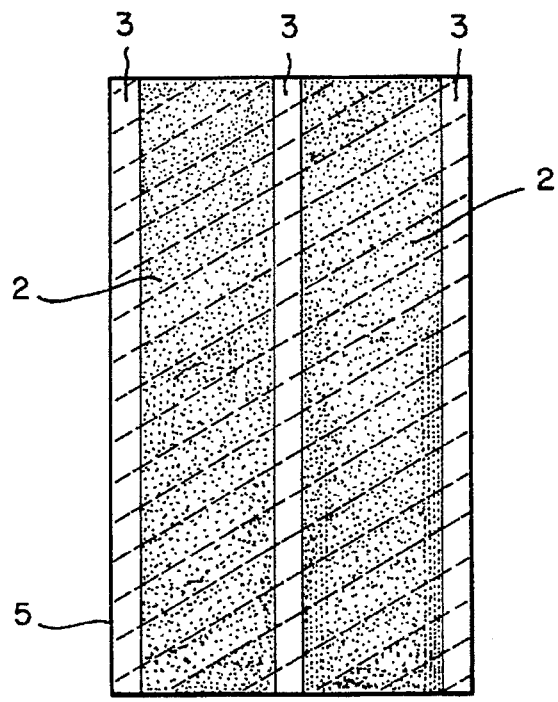
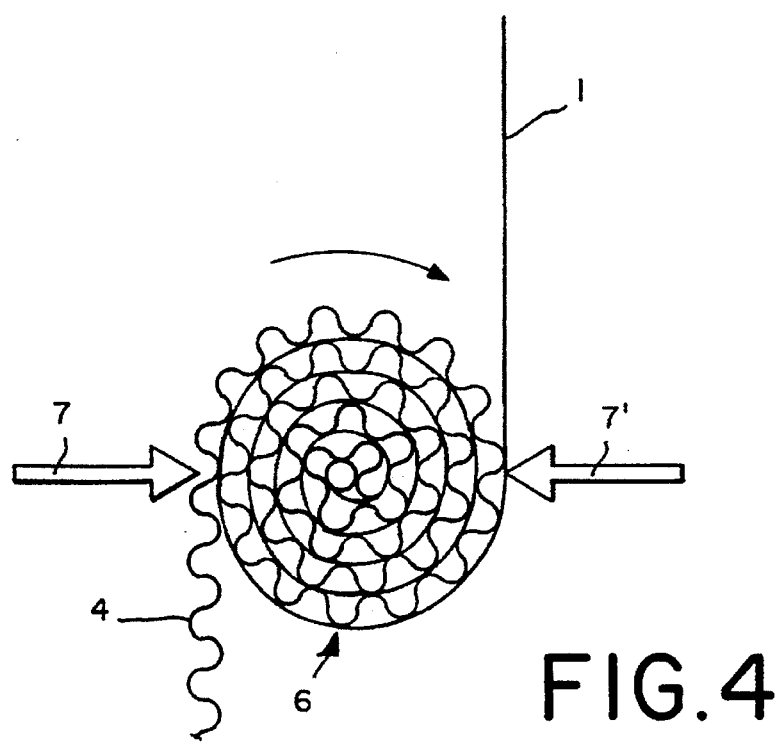
FIG.4

FIG.5
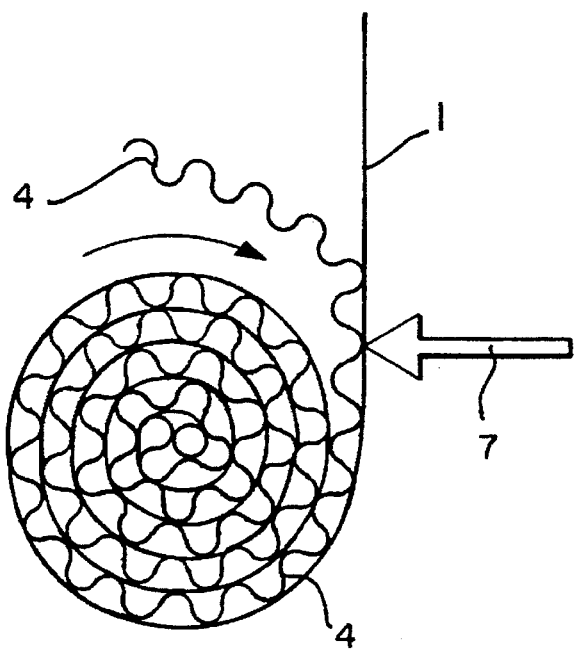
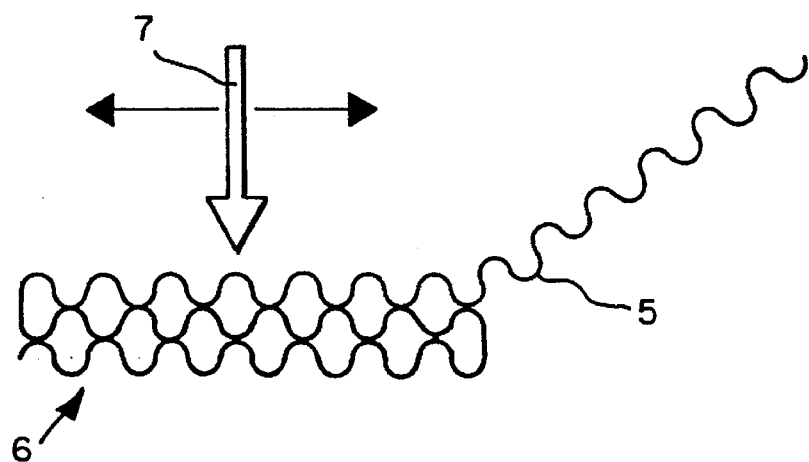
FIG.6

PROCESS FOR MANUFACTURING A COATED, MONOLITHIC METAL SUPPORT

INTRODUCTION AND BACKGROUND

The present invention relates to a process for manufacturing a coated, monolithic metal support formed of a volumetric curved, shaped body which is gas-permeable in the axial direction. Typically, the shaped body is cylindrical and is made up of one or more smooth and/or corrugated metal foil strips joined together by soldering or welding, their longitudinal extension lying transverse to the cylinder axis. The strips also optionally have slots, perforations and/or impressions and are stacked or folded and optionally intertwined or wound in a spiral manner in order to form the shaped body. In particular, the invention relates to a process for the manufacture of a monolithic metal support coated with a dispersion coating for use as a catalyst in chemical conversion reactions or as an absorber or adsorber for gaseous or liquid components of a mixture.

Coated metal supports are used in large numbers as catalysts in motor vehicle exhaust purification systems or as regeneratable absorbers or adsorbers for hydrocarbons and nitrogen oxides in exhaust gases.

The shaped bodies formed from metal foil strips have a cellular structure which permits the exhaust gas to be cleaned as it passes through in the axial direction. In the simplest case, the cellular structure consists of axially parallel flow channels. According to the type of corrugation of the metal foil strips, the flow channels may be inclined relative to the axial direction and also be angled. Slots, perforations and deformations give rise to a gas exchange between the various flow channels and to strong turbulence, and hence to intensive contact of the exhaust gas with the catalytically active coating.

Typical cell densities of metal support catalysts in vehicle exhaust catalysis are between 15 $cm^{-2}$ (96 $inch^{-2}$) and 78 $cm^{-2}$ (500 $inch^{-2}$). To improve the level of purification of the exhaust gases, cell densities of up to 186 $cm^{-2}$ (1200 $inch^{-2}$) are aimed at.

DE 29 46 685 C2 discloses a process for the manufacture of a metal support catalyst from a composite body disposed in a metal jacket. The composite body is made from smooth and corrugated or folded sheets of heat-resistant metal placed alternately one on top of another; the sheets being coated to form a bundle or wound up in a spiral manner, to produce a preliminary form of the composite body. This preliminary form is then welded at its ends, and the composite body is inserted into the metal jacket and is also welded thereto. Then the interior of the composite body is coated with a catalysis-promoting metal oxide.

DE 29 24 592 A1 also discloses a process for the manufacture of a support matrix for a metal support catalyst. The support matrix consists of smooth and corrugated sheets arranged alternately in layers and soldered together as a whole or by spot-soldering. The solder is applied to the specified places as a solder paste, a solder powder or a solder strip. For soldering, the whole support matrix is heated to the soldering temperature in a vacuum or in a protective gas atmosphere.

Both processes have in common that the catalytically active dispersion coating is not applied until the shaped body has been joined together, i.e. after welding or soldering. This means that, due to surface stresses, the dispersion coating collects at the acute angles between two contacting metal strips and thus the coating density over the cross-section of the shaped body is very uneven. The material collecting in the corners is not easily accessible to the exhaust gas to be cleaned, so that the catalytically active substance is not satisfactorily exploited. Furthermore, the accumulation of coating material also increases resistance to the flow of exhaust gas.

These disadvantages are less prominent in shaped bodies with comparatively low cell densities of up to 32 $cm^{-2}$. At higher cell densities, however, retrospective coating does carry an increasing risk of narrowing and blockage of the cells, so that shaped bodies with cell densities of more than 93 $cm^{-2}$ can barely be coated.

WO 92/14549 proposes to manufacture the shaped bodies from ready-coated metal foil strips at cell densities in the range between 800 and 1200 $inch^{-2}$ (corresponding to 125 to 186 $cm^{-2}$) and to insert the strips in the casing tube without further joining processes. In these metal support catalysts, adequate stability and resistance to pushing of the shaped body out of the casing tube due to exhaust pressure is only ensured by the high cell densities used. Metal support catalysts manufactured in this manner having relatively low cell densities do not have sufficient strength to withstand the pulsating exhaust gas pressure and the axial and radial oscillations caused thereby during operation.

SUMMARY OF THE INVENTION

An object of the present invention is to provide a process for manufacturing coated monolithic metal supports which makes it possible to produce coated metal supports independently of the cell density, the metal supports being extremely evenly coated, being composed of ready-coated metal foil strips, and at the same time having the high strength of metal supports whose metal foil strips are welded or soldered together before coating.

The above and other objects are achieved according to the invention by a process for manufacturing a monolithic metal support formed of a generally cylindrical shaped body which is gas-permeable in the axial direction, wherein the shaped body is composed of a plurality, i.e., one or more smooth and/or corrugated metal strips previously coated with a dispersion coating. The strips in their longitudinal extension lie transverse to the cylinder axis. The strips optionally have slots, perforations, deformations and/or impressions and being stacked or folded and optionally intertwined or wound up in a spiral manner in order to form the shaped body.

A feature of the present invention is that, during or after formation of the shaped body, the metal foil strips are welded or soldered to at least one adjacent metal foil strip or at least one adjacent layer of the same metal foil strip.

In order to enhance further the strength of the metal support, it may be advantageous to insert the shaped body in a casing tube and to solder or weld the two together directly or using a resilient metal mount in order to compensate for heat expansion.

In order to join the coated metal foil strips, electron beam or laser welding can be used in accordance with known techniques. Both processes are suitable for joining the metal foil strips during the formation of the shaped body. Thus, for example, in the manufacture of a spirally wound shaped body from a smooth and a corrugated strip, each newly added layer of a metal strip can be welded to the one below.

In the same way it is possible to weld the smooth and corrugated strip together in advance and only to wind or fold them afterwards and to twist the folded stack together if necessary according to DE 40 16 276 C1 or WO 89/07488. Since in this procedure the metal foil strips are not welded to every adjacent foil strip, usually it is necessary to fit the shaped body in a casing tube.

The strength of the shaped body can be increased by subsequent welding of the metal foil strips to the end faces of the shaped body. This step can be used as the only joining operation.

Joining together of the coated metal foil strips can be carried out by means of any number of any kind of continuous or broken contact seams or contact points. The contact lines are preferably annular, but spiral, sinusoidal or saw-toothed embodiments are conceivable, in which case for reasons of strength a secondary form of the contact line may be modelled on the primary form. Broken contact lines and individual points of contact with any spacing are also possible. It may be sufficient, for example, in the case of a spirally wound shaped body to make only two welded seams over the entire length of the shaped body.

BRIEF DESCRIPTION OF THE DRAWINGS

The present invention will be further understood with reference to the drawings, wherein: FIG. 1 is a schematic representation of a smooth metal foil strip 1 in a side view. FIG. 1-A is a schematic representation of a smooth metal foil strip 1 in a plan view. The coating 2 of the metal foil strip shown in the plan view has two uncoated parallel stripes 3;

FIG. 2 is a schematic representation of a corrugated metal foil strip 4 in a side view. FIG. 2-A is a schematic representation of a corrugated metal foil strip 4 in a plan view. The coating 2 of the metal foil strip shown in the plan view has two uncoated parallel stripes 3. The corrugation of the metal foil strip is aligned perpendicular to the longitudinal direction of the strip;

FIG. 3 is a schematic representation of a corrugated metal foil strip 5 in a side view. FIG. 3-A is a schematic representation of a corrugated metal foil strip 4 in a plan view. The coating 2 of the metal foil strip shown in the plan view has three uncoated parallel stripes 3. The corrugation of the metal foil strip forms an angle of less than 90° with the longitudinal direction of the strip;

FIG. 4 is a schematic cross sectional view of the shaped body showing the formation of a spirally wound shaped body 6 composed of a smooth 1 and a corrugated strip 4. Each winding of a strip is joined to the two adjacent windings;

FIG. 5 is a schematic cross sectional view of a shaped body showing the formation of a spirally wound shaped body 6 composed of a smooth 1 and a corrugated strip 4. The soldered or welded joint is only produced between the corrugated and the smooth strip;

FIG. 6 is a schematic view showing the formation of a folded shaped body 6;

DETAILED DESCRIPTION OF INVENTION

Figure 7:
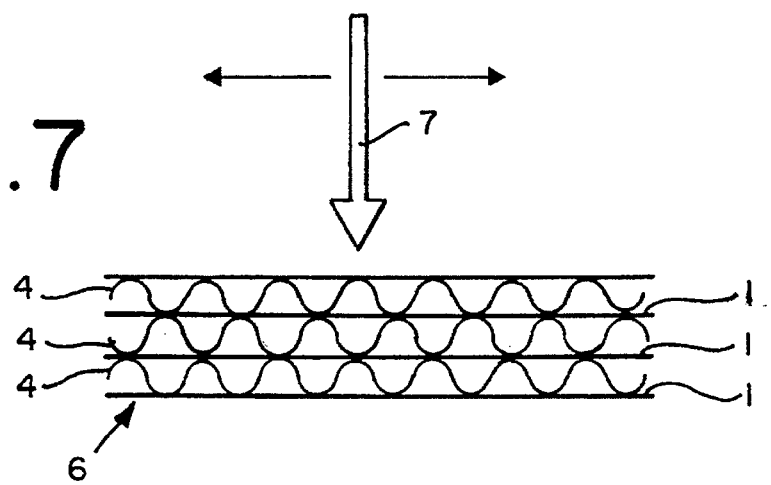
FIG. 7 is a schematic partial cross sectional view of the formation of a stacked shaped body 6.
Figure 8:
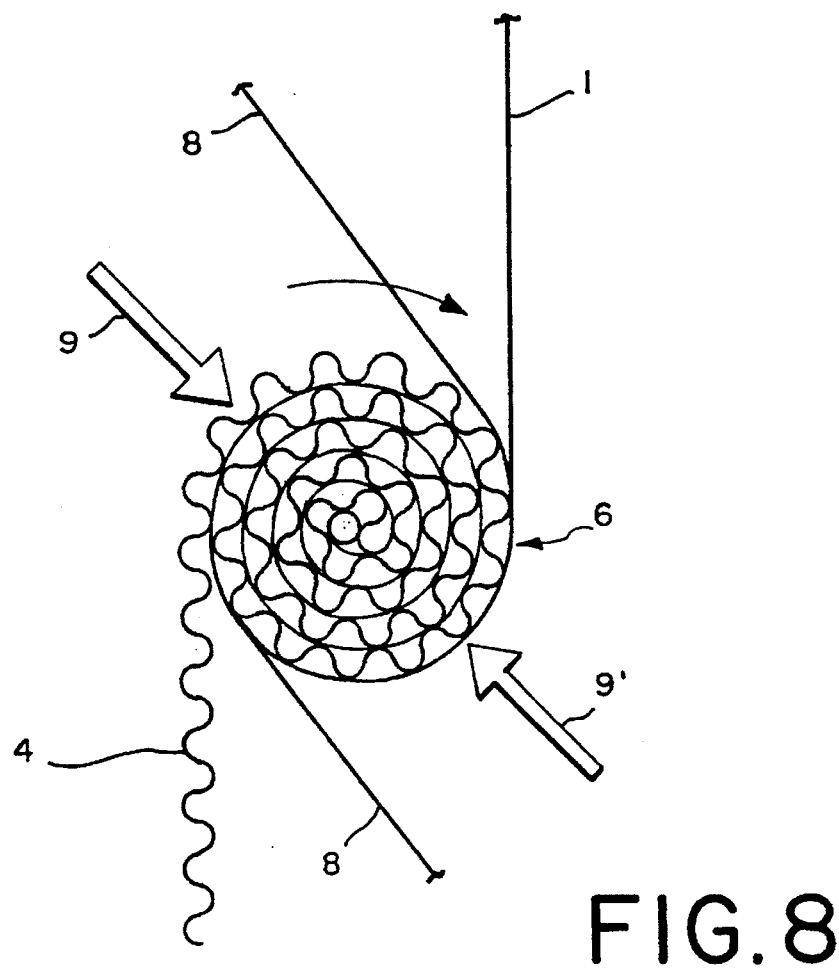
FIG. 8 is a schematic cross sectional view of the formation of a spirally wound shaped body 6 using solder strips 8; and, FIG. 9 is a schematic view showing end-face welding of a finished shaped body 6 by means of resistance welding.

In a particularly preferred embodiment of the process according to the invention, the dispersion coating of the metal foil strip or strips can be manufactured with one or more uncoated stripes parallel to the longitudinal direction of the strips, by which the strips are joined by soldering or welding to at least one adjacent metal strip or to at least one adjacent layer of the same metal strip during and/or after the formation of the shaped body.

In this preferred embodiment of the process, in addition to electron beam or laser welding, resistance welding, e.g. in the form of roller wheel welding can be advantageously applied. Alternatively, in this case it is possible to produce the joint by soldering.

In selecting a suitable welding process, it should be ensured that if temperature-sensitive dispersion coatings are used both the metal foil strips to be joined and if necessary the shaped body and the casing tube are exposed to high temperatures only at the contact points provided in order that the heat does not damage the dispersion coating. In the same way, if temperature-sensitive dispersion coatings are used, only those soldering processes can be used in which, as in welding, only the contact points are heated. For example, it is possible for a solder strip to be laid between two metal strips and the heat required for soldering to be generated locally by a laser or electron beam. If necessary, soldering or welding should take place in a protective gas atmosphere.

If the metal foil strips are provided with heat-resistant dispersion coatings, soldering is also suitable for joining the metal foil strips after formation of the shaped body. To this end, during formation of the shaped body, the uncoated stripes are spread with solder paste or solder strips are laid on these places. Then the whole shaped body is heated to the soldering temperature.

Joining by welding and/or soldering can be carried out at any place over the length of the shaped body, e.g. at one-quarter and three-quarters of the total length and/or also at the ends. The frequency of the joins depends on the required strength of the intended application. If due to inadequate process control the welding points lead to perforation of the metal foil, this is usually negligible. Such perforations may even be desirable, because they permit mixing of the gas passing through from one channel to the adjacent channel perpendicular to the direction of flow, which may improve the substance exchange between the gas and the coating.

Before welding or soldering of the metal foil strips to the ends of the finished shaped body, if the metal foil strips have not been left uncoated at their edges, it is advantageous for the sake of a durable joint to clean the metal foil strips by mechanical means, e.g. with a brush or to remove the coating from the ends of the metal foil strips by chemical methods, either completely or partly by etching or dissolving, before the welding operation.

The uncoated stripes on the metal foil strip can be produced simply by using baffles when applying the coating or by means of a separating agent layer to prevent coating or permit easy removal of the coating before welding or soldering, e.g. by simply heating followed by gentle blowing. In this manner, before coating, the uncoated stripes provided can be unstuck by means of a suitable adhesive tape in order to expose the stripes cleanly, for example after removing or thermally oxidizing away the coating.

The casing tube in which the shaped body is inserted and with which it is joined by soldering or welding can be built up from half-shells and have conically tapering ends for fitting into the exhaust pipe of a motor vehicle. Thus two or more shaped bodies can be inserted into a single casing tube and fixed therein. The casing tube or half-shells for receiving shaped bodies may have different end cross-sections. In this way it is possible to combine shaped bodies with different cell densities or lengths in one casing tube. The shaped body is described herein as being generally cylindrical which is intended to mean not only a right cylinder but ellipsoidal cross sections as well, In order to reduce mechanical stresses in the edge region of the shaped body due to temperature change stresses, measures can be taken to mount the shaped body resiliently in the casing tube, e.g. by means of a resilient, coarsely corrugated metal foil strip according to DE 38 17 490 A1.

In addition to the soldering or welding together of the casing tube and the shaped body, the shaped body can also be inserted into a housing with positive locking and secured against axial displacement by crimping or conical end pieces. Optionally, in the case of positively locking housings, the shaped body can be wholly or partly wrapped in fiber mattings and/or swelling mattings in order to provide a seal and thermal insulation, as well as to dampen vibrations. In this case the shaped body should be additionally wrapped in one or more coated or uncoated foil layers.

The metal foil strips may have different compositions according to the field of application. For vehicle exhaust purification, heat-resistant steels containing chromium, aluminum and optionally nickel in addition to iron as essential components are recommended. For stationary exhaust purification processes and general chemical processes, less heat-resistant steel compositions which are on the other hand more resistant to $SO_2$, or $SO_3$, for example may be selected. In the case of absorption and adsorption applications at low temperatures, even aluminum can be used as a material for the metal foil strips.

Preferred thicknesses of the metal foil strips are between 40 and 150μm. A particular advantage of the process according to the invention is the fact that shaped bodies can be manufactured with very low as well as very high cell densities. The process is preferably usable with cell densities greater than 15 $cm^{-2}$.

The composition of the dispersion coating on the metal foil strips depends on the intended application of the finished shaped body as will be apparent to those skilled in the art. If used as a catalyst, the dispersion coating consists of fine-particle metal oxides, usually having a large surface area, such as aluminum oxide, silicon dioxide and titanium oxide, as well as mixtures thereof, on which the catalytically active components, e.g. the noble metals of the platinum group or non-precious metals, and optionally promoters are deposited. The catalytically active components and optionally promoters can be added even before coating of the usually aqueous coating dispersion in the form of soluble or insoluble precursors which are not converted into the catalytically active components proper until the dispersion coating has been calcined. But it is also possible to impregnate the finished shaped body retrospectively with further catalytically active components and/or promoters. Retrospective impregnation can be carried out before the coated shaped body is fitted in a casing tube or housing, or even afterwards. The choice of catalytically active components is well within the scope of the person skilled in the art.

If the coated shaped body is used as an absorber or adsorber for toxins in the exhaust gas, frequently a fine-particle coating of zeolites is used. Multi-layered coatings of various fine-particle substances are also possible.

The following examples are intended to explain the process according to the invention in more detail.

EXAMPLE 1

FIG. 1 shows in a side view and FIG. 1-A shows in a plan view respectively of three different embodiments of metal foil strips 1, which are provided on both sides with a coating 2, which according to the preferred embodiment of the manufacturing process has corresponding uncoated stripes 3 on each side. The uncoated stripes extend parallel to the longitudinal direction of the metal foil strips.

FIG. 1-A shows a smooth metal foil strip 1 with two parallel uncoated stripes 2.

FIG. 2 shows a corrugated metal foil strip 4, which. can be processed with the smooth strip of FIG. 1a into a spirally wound shaped body. The corrugation is aligned perpendicular to the longitudinal direction of the strip.

FIG. 1C shows a corrugated metal foil strip 5 with three parallel uncoated stripes 2. The corrugation forms an angle of less than 90° with the longitudinal direction of the strip. This strip can be folded into a shaped body in a zig-zag manner without the interposition of a smooth strip.

EXAMPLE 2

FIG. 4 shows the manufacture according to the invention of a spirally wound shaped body 6 composed of a smooth. metal foil strip 1 and a corrugated metal foil strip 4. Both strips are provided with a dispersion coating, as is shown in FIG. 1-A and 2-A, and have two parallel uncoated stripes.

The strips are supplied to the winding device (not shown in FIG. 4) from two different sides and are wound in the direction of rotation of the curved arrow. The welding energy, represented by the arrows 7 and 7', is supplied to the uncoated stripes on two diametrically opposite points of the winding body 6 so that each winding of the shaped body is welded to the winding below.

This results in a shaped body in which each winding of a strip is welded to the two adjacent windings of the other strip. The shaped body thus obtained has inherent strength and does not require an enveloping casing tube. Instead, it is possible to make the smooth strip longer than the corrugated strip and finally to wrap the smooth strip once or more round the shaped body.

EXAMPLE 3

FIG. 5 shows the manufacture according to the invention of a spirally wound shaped body 6 composed of a smooth metal foil strip 1 and a corrugated metal foil strip 4. Both strips are provided with a dispersion coating, as is shown in FIG. 1-A and 1-B, and have two parallel uncoated stripes.

The strips are supplied to the winding device (not shown in FIG. 5) from two different sides and are wound in the direction of rotation of the curved arrow. The smooth and the corrugated metal foil strips are welded at their uncoated stripes by the application of welding energy 7 before winding.

The resulting shaped body needs to be inserted into an enveloping casing tube for final fixing of the spiral form or to be welded or soldered retrospectively at its ends.

In examples 2 and 3 of the process according to the invention, the smooth metal foil strip can also be replaced by a second corrugated metal foil strip, which has a different corrugation from the first corrugated strip.

EXAMPLE 4

A zig-zag-folded shaped body 6 as shown in FIG. 6 is manufactured from a corrugated metal foil strip 5.

In order to prevent the corrugations of stacked layers of the strip from locking together and thus preventing the formation of flow channels for the gas to be treated, the corrugation is not aligned perpendicular to the longitudinal direction of the foil strip, but is inclined relative to the perpendicular, as is shown in FIG. 3-A.

Each new layer of the zig-zag folding is welded to the layer of the metal foil strip below. The arrow 7 represents the supply of welding energy. The site of welding can be displaced along the metal foil strip to any convenient location.

This results in a shaped body of rectangular cross-section which has an inherently stable form.

EXAMPLE 5

A stacked shaped body 6, as is shown in FIG. 7, of alternating layers of differently corrugated metal foil strips 1 and 4 is manufactured. Each new layer of a metal foil strip is welded to the one below.

This results in a shaped body of rectangular cross-section having a stable form.

EXAMPLE 6

A spirally wound shaped body 6 similar to Example 2 is manufactured. During winding up, solder strips 8 are wound into the shaped body at the sites of the uncoated stripes and are soldered simultaneously by the application of heat by laser beams 9 and 9'.

EXAMPLE 7

Figure 9:
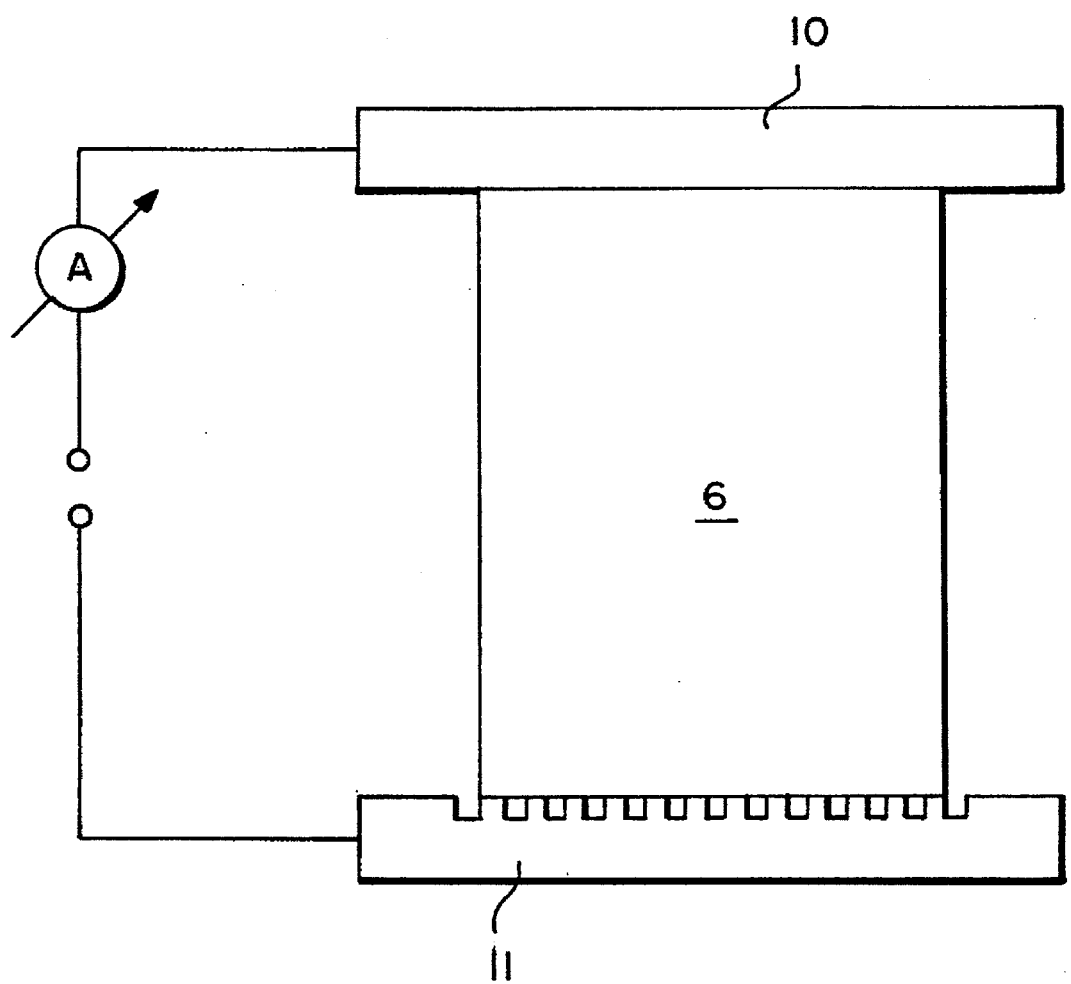

The shaped bodies 6 manufactured according to Examples 2 to 6 are subsequently further reinforced by electric resistance welding at the ends, as is shown in FIG. 9. To this end the shaped body is clamped by its ends between the electrodes 10 and 11 of an electric resistance welding machine, as is described in DE 29 46 685 C2. The lower electrode 11 is provided with grooves. For welding the lower end of the shaped body, a current of 200–300 Amperes is passed through this electrode for 2 to 3 seconds, according to the cross-sectional area of the shaped body. This process is repeated several times, while the shaped body is rotated about its cylinder axis. The second end of the shaped body is similarly welded after turning of the body.

The manufacturing process according to the invention is in no way limited to the embodiments described in the above examples. The person skilled in the art would realize that the measures shown in Examples 1 to 7 can be combined in any manner.

Further variations and modifications of the foregoing will be apparent to those skilled in the art and are intended to be encompassed by the claims appended hereto. German priority document P 44 11 302.1 is relied on and incorporated herein by reference.

We claim:

1. A process for manufacturing a coated, monolithic metal support consisting of a generally cylindrical, shaped body which is gas-permeable in the axial direction and which is formed of at least one metal foil strip which may be smooth, corrugated or a combination of smooth and corrupted metal foil strip, said strip having been previously coated with a dispersion coating, the longitudinal extension lying transverse to the cylinder axis, and being stacked or folded and optionally intertwined or wound in a spiral manner in order to form the shaped body, comprising, during or after formation of said shaped body, welding or soldering said metal foil strip to at least one adjacent metal foil strip or to at least one adjacent layer of the same metal foil strip.

2. The process according to claim 1, wherein said strip has slots, perforations, impressions or combination thereof.

3. The process according to claim 1, further comprising inserting said shaped body into a casing tube and joining said shaped body thereto by welding or soldering either direct or using a resilient metal mount in order to compensate for heat expansion.

4. The process according to claim 1, wherein the welding or soldering are formed by electron beam or laser welding.

5. The process according to claim 1, wherein the dispersion coating of the metal foil strip leaves at least one uncoated stripe parallel to the longitudinal direction of said strip, by which stripe said strip is joined by soldering or welding to at least one adjacent metal foil strip or to at least one adjacent layer of the same metal foil strip.

6. The process according to claim 5, wherein said soldering or welding is produced by electron beam, laser or resistance welding.

7. The process according to claim 6, wherein the shaped body is inserted into a casing tube and is soldered or welded thereto directly or with the use of a resilient metal mount in order to compensate for heat expansion.

8. The process according to claim 5, wherein the strip is joined by soldering.

9. The process according to claim 5 further comprising soldering or welding at least one adjacent metal strip after the formation of said shaped body.

10. The process according to claim 5 further comprising soldering or welding at least one adjacent metal strip during the formation of said shaped body.

11. The process according to claim 1 further comprising after manufacture of the shaped body or fixing of the shaped body into the casing tube, further catalytically active components and/or promoters are applied to said shaped body by impregnation.

12. A product which is a coated monolithic metal support consisting of a generally cylindrical, shaped body which is gas-permeable in the axial direction and which is formed of at least one metal foil strip which may be smooth, corrugated or a combination of smooth and corrupted metal foil strip, said strip having been previously coated with a dispersion coating, the longitudinal extension lying transverse to the cylinder axis, and being stacked or folded and optionally intertwined or wound in a spiral manner in order to form the shaped body, said product having been formed by a process comprising, during or after formation of said shaped body, welding or soldering said metal foil strip to at least one adjacent metal foil strip or to at least one adjacent layer of the same metal foil strip.

* * * * *